United States Patent
Chiola et al.

[15] 3,653,813
[45] Apr. 4, 1972

[54] PROCESS FOR PREPARING RARE EARTH NORMAL TUNGSTATES

[72] Inventors: Vincent Chiola; George J. Kamin; Clarence D. Vanderpool, all of Towanda, Pa.

[73] Assignee: Sylvania Electric Products Inc.

[22] Filed: June 24, 1970

[21] Appl. No.: 49,570

[52] U.S. Cl. ................................23/15 W, 23/51 R, 23/23, 23/24 R
[51] Int. Cl. ..............................................C22b 59/00
[58] Field of Search......................23/15 W, 22-24, 23/51

[56] References Cited

UNITED STATES PATENTS

| | | | |
|---|---|---|---|
| 3,322,552 | 5/1967 | Roberts et al. | 23/51 R X |
| 3,441,512 | 4/1969 | Durkee | 23/51 R X |

FOREIGN PATENTS OR APPLICATIONS

| | | | |
|---|---|---|---|
| 950,774 | 2/1964 | Great Britain | 23/51 |

OTHER PUBLICATIONS

Banerjee, " Journal of Indian Chemical Society," Vol. 22, 1945, pp. 280–282.
Vickery, " Journal of the Chemical Society (London)," Part 3, 1949, pp. 2501–2505.
Rane et al., " Journal of The Indian Chemical Society," Vol. 8, 1931, pp. 289–292.
Rogers et al., " Journal of the American Chemical Society," Vol. 26, 1905, pp. 1474–1484.

*Primary Examiner*—Herbert T. Carter
*Attorney*—Norman J. O'Malley, Donald R. Castle and William H. McNeill

[57] ABSTRACT

Rare-earth normal tungstates are prepared by reacting soluble rare-earth salts and an aqueous solution of ammonium metatungstate under controlled pH conditions and agitation. After agitating for at least about 3 hours, the solid rare-earth normal tungstates are removed, washed with deionized water, and dried under controlled temperature conditions. Especially preferred as soluble rare-earth sources are oxides and carbonates.

12 Claims, No Drawings

PROCESS FOR PREPARING RARE EARTH NORMAL TUNGSTATES

BACKGROUND OF THE INVENTION

This invention relates to an improved method for preparing rare-earth normal tungstates. Specifically, it relates to a process for preparing rare-earth normal tungstates by precipitating solid rare-earth normal tungstates from a solution comprising a soluble rare-earth source and ammonium metatungstate under controlled pH conditions.

The preparation of rare-earth normal tungstates has been known for some time. The classical method of preparation is the direct firing of the rare-earth oxide to the corresponding tungstate according to the equation:

$$Ln_2O_3 + 3WO_3 \xrightarrow{700-1000°C} Ln_2(WO_4)_3$$

where Ln denotes yttrium and one of the rare earths of the Lanthanide series, with the exception of cerium, praesodymium and terbium.

In the case of cerium, praesodymium and terbium, which have a tendency to exist in the tetravalent state, the rare-earth tungstates have generally been prepared by firing the rare-earth carbonates, instead of the tetravalent or mixed-valent oxide, to the corresponding tungstate according to the equation:

$$Ln_2(CO_3)_3 \cdot xH_2O + 3WO_3 \xrightarrow{700-1000°C} Ln_2(WO_4)_3 + 3CO_2 + xH_2O$$

where Ln denotes yttrium or any rare earth, but especially cerium, praeseodymium, and terbium.

In the application of the direct firing method, the oxide or carbonates are blended and fired. The resultant product is then reground and refired until the material is completely converted to the desired rare-earth tungstate. In practice this method necessitates any where from three to six separate firings and blendings, causing this technique to be slow and time consuming.

Rare-earth normal tungstates have also been prepared by precipitation from sodium tungstate solutions by the addition of soluble rare-earth salts. Although a generally rapid technique, the method has a number of drawbacks including: (1) the product is usually contaminated with sodium or other cationic impurities, and (2) very dilute solutions of $Na_2WO_4 \cdot 2H_2O$ (150 g/150 liter $H_2O$) are needed to prepare pure products. Because of these, material handling problems for large-scale production can be quite formidable.

It is believed, therefore, that a process for preparing rare-earth normal tungstates which is rapid, produces pure material, is amendable to large-scale production, and allows use of very concentrated solutions, without affecting the efficiency of the process, is an advancement in the art.

SUMMARY OF THE INVENTION

In accordance with one aspect of the invention, there is provided a process for producing rare-earth normal tungstates by precipitating solid rare-earth normal tungstates from a solution comprising a soluble rare-earth source and ammonium metatungstate. The process comprises reacting a soluble rare-earth source and an aqueous solution of ammonium metatungstate in sufficient amounts to form a rare-earth normal tungstate, and maintaining the pH of the solution at a range from about 4.0 to 5.5 for at least about 3 hours, before separating the solid rare-earth tungstate from the aqueous phase. The rare-earth tungstate is then washed with water and thereafter heated to a temperature of about 175° C. for at least about 3 hours.

DESCRIPTION OF THE PREFERRED EMBODIMENTS

For a better understanding of the present invention, together with other and further objects, advantages, and capabilities thereof, reference is made to the following disclosure and appended claims in connection with the above description of one of the aspects of the invention.

The present invention relates to a method of preparing rare-earth normal tungstates. When mildly acidic rare-earth solutions are mixed with ammonium metatungstate solution, no precipitation occurs. Surprisingly, it has been found that hydrated rare-earth normal tungstates will precipitate from the above-mentioned solution if the pH of the medium is held from about 4.0 to 5.5.

Referring now to the invention with greater particularity, an aqueous reaction medium comprising a soluble rare-earth source and an aqueous solution containing at least a stoichiometric amount of ammonium metatungstate are combined to form a rare-earth normal tungstate. The soluble rare-earth source can be dissolved directly in an aqueous solution of ammonium metatungstate; but the preferred method is to dissolve the soluble rare-earth source in an acid solution, preferably about 4 N nitric acid, and to dissolve the ammonium metatungstate to the prescribed concentration, before admixing the two solutions. The latter method allows a more rapid dissolution of the rare-earth source.

Soluble rare-earth sources are oxides and salts, with the preferred sources being oxides, carbonates, and acetates. The rare-earth oxides and salts can be dissolved in any convenient acid or water, as long as it is compatible with ammonium metatungstate. Yttrium, as well as the lanthanide series, for purposes of this invention, are to be considered a rare earth. At least stoichiometric amounts of ammonium metatungstate solution and the soluble rare-earth source should be used, but ammonium metatungstate solution can vary up to about 110 percent, by weight of the theoretical amount required to produce the rare earth normal tungstate. The concentration of ammonium metatungstate solution can be as high as 1,100 g./liter, but concentrations of about 600 to about 640 g./liter are preferred to assure complete dissolution and a viscosity amendable to mixing on a large scale.

The pH of the aforementioned medium is maintained from about 4.0 to about 5.5 by the addition of a basic pH modifier, preferably ammonium hydroxide, although any convenient aqueous base can be used, while agitating for at least about 3 hours. Below a pH of about 4, precipitation of rare-earth normal tungstates generally does not occur. At pH's greater than about 5.5, rare-earth hydroxides generally form. Agitating for at least about 3 hours assures complete conversion to rare-earth normal tungstate. Agitation is generally provided with conventional agitators used to provide agitation to solutions having the viscosity of about that of water. The degree of agitation will be dependent upon the type of vessel used, availability of equipment and other factors that will be obvious to those familiar with chemical processing equipment design.

The only rare-earth which requires any special treatment is cerium. In the preparation of cerium normal tungstate, care must be taken to maintain the cerium in the trivalent state in solution. In practice, this can be achieved by using a stable trivalent cerium salt such as cerous carbonate or cerous acetate as a starting material.

The precipitated rare-earth normal tungstate can be separated from the aqueous phase by conventional means, such as, filtering, decanting, centrifuging, etc. After separating the solid rare-earth normal tungstate is washed at least once with water to remove any excess starting material which can be present. The precipitated rare-earth normal tungstates are in a highly hydrated state. They can be oven dried at a temperature of about 175° C for at least about 3 hours to the trihydrate, or they can be heated to at least about 250° C for about 3 hours to the anhydrous rare-earth tungstate.

The following examples are submitted to illustrate and not to limit the invention. All parts, proportions, and percentages are by weight unless otherwise given.

EXAMPLE 1

About 30 parts of erbium carbonate pentahydrate are slurried in about 100 parts deionized water. Sufficient 4 N nitric acid is added slowly, while stirring, until the carbonate is completely dissolved. About 40 parts of ammonium metatungstate are dissolved in about 100 parts deionized water. Both solutions are filtered to remove any insoluble residue and both are then mixed. Dilute ammonium hydroxide (1:3 $NH_4OH:H_2O$) solution is added until the pH of the mixed rare-earth metatungstate solution reaches about 5.5. The solution is then agitated for about 4 hours while maintaining the pH of solution at about 4.0 to about 5.5, by appropriate addition of ammonium hydroxide. The precipitate is collected by filtration, washed with deionized water, and fired at about 900° C. for about 2 hours.

The product yield is 90 percent of theoretical. The material is identified as $Er_2(WO_4)_3$ by its X-ray diffraction pattern. Analysis of the material shows 64.5% $WO_3$ and 35.7% $Er_2O_3$, compared to the theoretical values of 64.5% $WO_3$ and 35.5% $Er_2O_3$.

EXAMPLE 2

About 33.6 parts of europium oxide are slurried in about 100 parts deionized water. Sufficient 4 N nitric acid is added slowly, while stirring, to completely dissolve the oxide. About 75 parts of ammonium metatungstate are dissolved in about 150 parts deionized water. The solutions are filtered and thoroughly mixed and treated subsequently in a manner as given in Example 1.

The final product is identified as $Eu_2(WO_4)_3$ by its X-ray diffraction pattern and yields 94% of the theoretical value. Analysis of the material shows 66.6% $WO_3$ and 33.4% $Eu_2O_3$.

EXAMPLE 3

About 24.5 parts of yttrium oxide are slurried in about 100 parts water. Sufficient 4 N nitric acid is added slowly, while stirring to dissolve the oxide. About 87 parts of ammonium metatungstate are dissolved in about 150 parts deionized water. The solutions are filtered, thoroughly mixed, and then treated in subsequent steps as in the procedure given in Example 1.

The final product is identified as $Y_2(WO_4)_3$ by its X-ray diffraction pattern and yields 96 percent of the theoretical value. Analysis of the material shows 75.1% $WO_3$ and 24.9 to $Y_2O_3$, compared to the theoretical values of 75.5% $WO_4$ and 24.5% $Y_2O_3$.

EXAMPLE 4

About 32.6 parts of neodymium oxide and about 78 parts of ammonium metatungstate are treated according to the procedure given in Example 2.

The final product is identified as $Nd_2(WO_4)_3$ by its X-ray diffraction pattern and yields 97 percent of the theoretical value. Analysis of the material shows 67.2% $WO_3$ and 32.6% $Nd_2O_3$, compared to the theoretical values of 67.4% $WO_3$ and 32.6% $Nd_2O_3$.

EXAMPLE 5

About 55 parts cerous carbonate pentahydrate and about 78.9 parts ammonium metatungstate are treated according to the procedure given in Example 1, with the exception that the pH of the mixed solution is kept below about 4.5 and above 4.0.

The product is identified as $Ce_2(WO_4)_3$ by its X-ray diffraction pattern, and yields 96 percent of its theoretical value. Analysis of the material shows 67.8% $WO_3$ and 33.6% $CeO_2$, compared to the theoretical values of 67.9% $WO_3$ and 33.5% $CeO_2$.

While there has been shown and described what are at present considered the preferred embodiments of the invention, it will be obvious to those skilled in the art that various changes and modifications may be made therein without departing from the scope of the invention as defined by the appended claims.

What Is claimed Is:

1. A process for preparing rare-earth normal tungstates comprising the steps of:
   a. forming an aqueous reaction medium comprising a soluble trivalent rare-earth source and an aqueous solution of ammonium metatung-state, said ammonium metatungstate being present in at least stoichiometric amounts to form a rare-earth normal tungstate;
   b. maintaining the pH of said aqueous reaction medium from about 4.0 to about 5.5 by the addition of a pH modifier, while agitating said medium for a minimum of about 3 hours, to thereby form a two-phase system comprising a solid rare-earth normal tungstate and an aqueous phase;
   c. separating said solid rare-earth normal tungstate from said aqueous phase,
   d. washing said solid rare-earth normal tungstate with water; and
   e. thereafter heating said solid rare-earth normal tungstate at a temperature of at least about 175° C for at least about 3 hours.

2. A process according to claim 1, wherein said soluble rare-earth source is dissolved in said aqueous solution of ammonium metatungstate to form said aqueous reaction medium.

3. A process according to claim 1, wherein said soluble rare-earth source is dissolved in an acid solution prior to forming said aqueous reaction medium.

4. A process according to claim 3, wherein said acid solution is nitric acid.

5. A process according to claim 3, wherein said soluble rare-earth source is selected from the group consisting of rare earth oxides and rare-earth salts.

6. A process according to claim 5, wherein said soluble rare-earth source is carbonate.

7. A process according to claim 5, wherein said soluble rare-earth source is an oxide.

8. A process according to claim 5, wherein said soluble rare-earth source is an acetate.

9. A process according to claim 3, wherein said pH modifier is ammonium hydroxide.

10. A process according to claim 3, wherein said amount of ammonium metatungstate present is less than 110 percent of the theoretical amount to produce said rare earth normal tungstate.

11. A process according to claim 3, wherein said heating is from about 3 hours to about 8 hours.

12. A process according to claim 3, wherein said temperature is from about 175° C to about 900° C.

* * * * *